United States Patent
Watt et al.

(10) Patent No.: US 10,146,664 B2
(45) Date of Patent: Dec. 4, 2018

(54) VIRTUAL TEST ENVIRONMENT FOR WEBPAGES WITH AUTOMATION FEATURES

(71) Applicant: DELL PRODUCTS, LP, Round Rock, TX (US)

(72) Inventors: James S. Watt, Pflugerville, TX (US); Kareemullah Khan Fazal, Austin, TX (US); Mark D. Owens, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/053,540

(22) Filed: Feb. 25, 2016

(65) Prior Publication Data

US 2017/0249238 A1    Aug. 31, 2017

(51) Int. Cl.
| | |
|---|---|
| G06F 9/44 | (2018.01) |
| G06F 11/36 | (2006.01) |
| H04L 29/08 | (2006.01) |
| H04L 12/26 | (2006.01) |
| G06F 17/30 | (2006.01) |
| G06F 17/24 | (2006.01) |

(52) U.S. Cl.
CPC ........ *G06F 11/3664* (2013.01); *G06F 11/368* (2013.01); *G06F 17/248* (2013.01); *G06F 17/3089* (2013.01); *H04L 43/08* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,627,813 B2 | 12/2009 | Roser | |
| 7,823,057 B1 | 10/2010 | Schultz et al. | |
| 9,031,995 B1 | 5/2015 | Raden, II et al. | |
| 2004/0107267 A1* | 6/2004 | Donker | G06F 17/30887 709/218 |
| 2005/0188361 A1 | 8/2005 | Cai et al. | |
| 2006/0100931 A1* | 5/2006 | Deaton | G06Q 20/20 705/15 |
| 2007/0198656 A1* | 8/2007 | Mazzaferri | G06F 3/1415 709/218 |

(Continued)

*Primary Examiner* — Chameli Das
(74) *Attorney, Agent, or Firm* — Larson Newman, LP (57) ABSTRACT

A test environment as described herein allows for testing webpages prior to deployment to a website. More particularly, a virtual test environment allows a developer to virtually test webpages instantiated from representations of webpages stored in a repository. In an example of testing, upon a change to a webpage of a website, one or more virtual test environments may be instantiated to test the webpage and associated webpages. In an example of test environment functionality, the test environment may generate templates representing webpages from a base template representing a set of features common to the webpages. Furthermore, a centralized computer may be used to coordinate templates representing webpages by, for example, managing naming. The centralized computer may further track virtual test environments. In a further example of test environment functionality, templates representing webpages may be generated from webpage source code of the webpages.

7 Claims, 9 Drawing Sheets (56) References Cited

U.S. PATENT DOCUMENTS

| | | | |
|---|---|---|---|
| 2008/0155334 A1* | 6/2008 | Mills | G06F 11/261 714/37 |
| 2008/0295064 A1 | 11/2008 | Mitra et al. | |
| 2009/0144698 A1* | 6/2009 | Fanning | G06F 8/75 717/120 |
| 2010/0318894 A1 | 12/2010 | Billharz et al. | |
| 2011/0145694 A1 | 6/2011 | Graves et al. | |
| 2013/0019314 A1* | 1/2013 | Ji | H04L 67/02 726/25 |
| 2014/0129879 A1* | 5/2014 | Sekiguchi | G06F 11/3668 714/38.1 |
| 2014/0129924 A1 | 5/2014 | Le Bescond de Coatpont | |
| 2015/0074659 A1* | 3/2015 | Madsen | G06F 8/61 717/177 |
| 2015/0242631 A1* | 8/2015 | Cabrera | G06F 21/577 726/25 |
| 2016/0034468 A1* | 2/2016 | Hart | G06F 17/3053 707/751 |
| 2017/0013085 A1* | 1/2017 | Ellen | G06Q 30/02 |
| 2017/0091460 A1* | 3/2017 | Kuhr | G06F 17/30312 |

* cited by examiner

VIRTUAL TEST ENVIRONMENT FOR WEBPAGES WITH AUTOMATION FEATURES

CROSS REFERENCE TO RELATED APPLICATIONS

This application is a continuation of U.S. patent application Ser. No. 15/053,509 entitled "Dynamic Virtual Testing Environment for Webpages," filed on Sep. 25, 2016, the disclosure of which is hereby expressly incorporated by reference in its entirety.

FIELD OF THE DISCLOSURE

The present disclosure generally relates to information handling systems, and more particularly relates to testing webpages prior to deployment in a web environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Websites are increasingly complex and highly coupled-both within themselves, and with other websites and back-end servers. Websites are comprised of webpages, and these webpages may have links to other webpages and websites, and further may be in communication with backend servers responsible for directing information to entities for use by the entities. For example, Dell.com is a website hosted on the world wide web to allow users to interface with Dell Corp. of Round Rock Tex. Dell.com is a large scale and complex website with hundreds of interlinked webpages and which provides product support and purchasing options.

SUMMARY

A test environment allows for testing webpages prior to deployment of the webpages. For example, in response to a webpage modification, one or more virtual test environments may be instantiated to test the webpage and associated webpages. The test environment may also have the functionality to generate templates representing webpages from a base template representing a set of features common to the webpages. A centralized computer may be used to coordinate templates representing webpages by, for example, managing naming. The centralized computer may further track virtual test environments. The test environment may also have the functionality to generate templates representing webpages from webpage source code of the webpages.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A website may be generally considered to be a web environment hosting webpages and providing communication channels between web browsers operated by users and backend servers responsible for directing information to entities for use by the entities. Thus a web environment supports webpages and communications. Webpages may provide links to other webpages, media, such as pictures or writing, and other components generally which make up the webpage. Within a web environment, webpages and the components making up webpages may be considered to be deployment components which are deployed on a website to make up the website.

Testing the correctness of deployment components is a significant challenge due to the inherent inter-relation among components when deployed. In a very simple example, on a webpage offering a computer notebook for sale, testing components requires determining if the picture component correctly corresponds to the product number component and if the purchase hyperlink component directs to a component that allows for purchase of a product accurately defined by the product number. To try to ensure correct webpages, components of webpages and links between webpages, website developers have resorted to long test cycles and stability windows in which webpage changes are frozen. Furthermore test and hosting environments exist in separate spaces: for example, a webpage development team may test webpages, for example, by reviewing the code for the webpages and viewing the webpages, prior to deploying the webpages for hosting. Thus, there is only an approximation of the correct relations between the deployed components prior to deployment, such that upon deployment it may be discovered that there are errors in the interrelations and dependencies among deployed components-manifested in the webpage errors users often experience when browsing a website.

According to embodiments disclosed herein, to test deployment components such as webpages, webpages and components of webpages may be tested prior to webpage deployment via a virtual test environment. The virtual test environment may include a representation of components associated with a webpage. For example, a virtual test environment may provide virtual connections for a webpage under test based on the component links of the webpage so that the validity of the links on the webpage may be tested in the virtual test environment. A repository of the virtual test environment may maintain information on webpages associated with the virtual connections of the webpage under test so that the virtual test environment associates updated webpages with the respective hyperlinks of the webpage under test to allow for test of how the webpage under test will interface with associated webpages.

Figure 1:
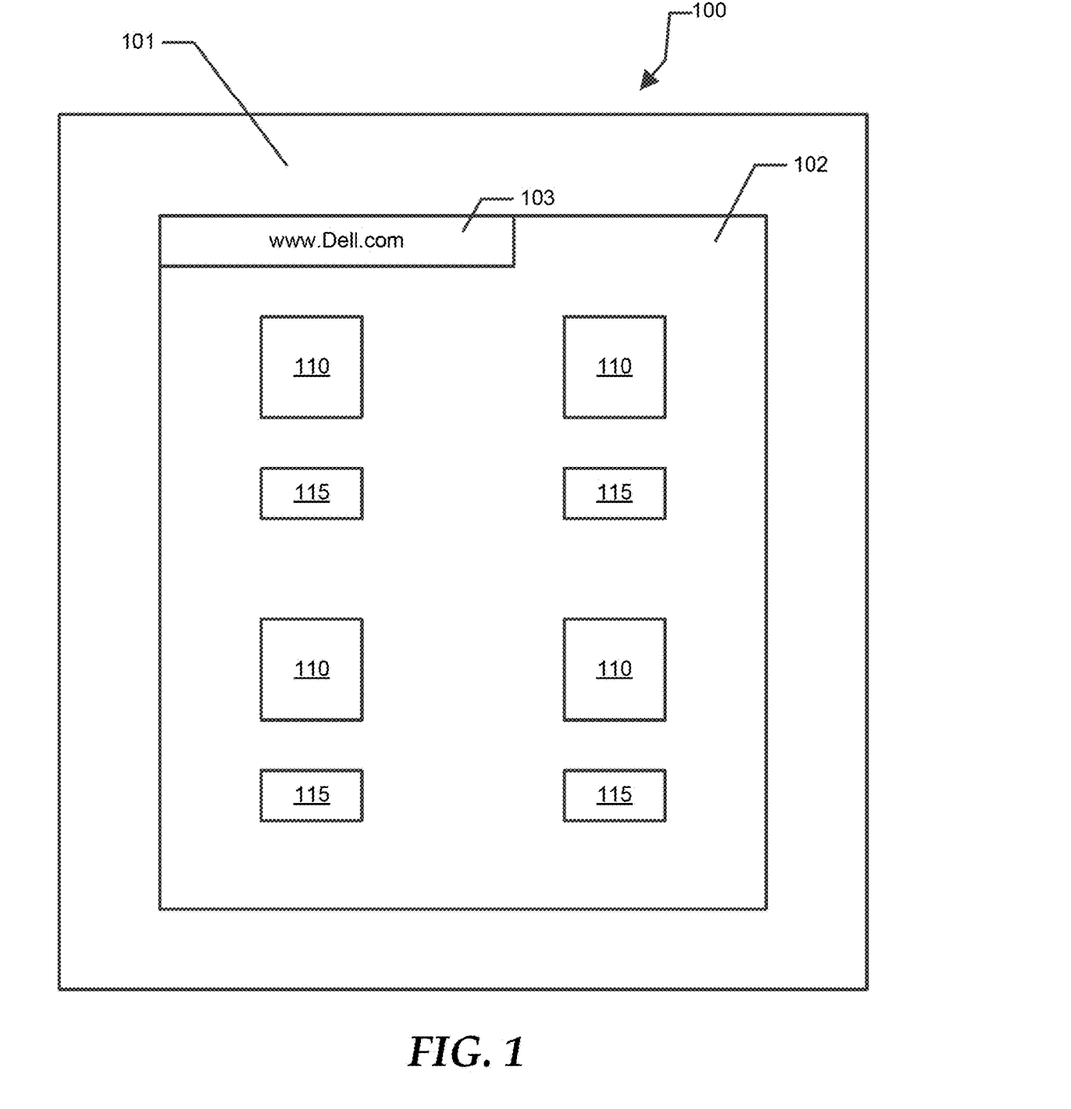
FIG. 1 is a diagrammatic representation of a web environment.

FIG. 1 shows a web environment 100 that includes website 101 having a webpage 102. Webpage 102 includes a webpage address 103, and media components 110, and hyperlink components 115 associated with the respective media component. Hyperlink components 115 link webpage 103 to other webpages.

Figure 2:
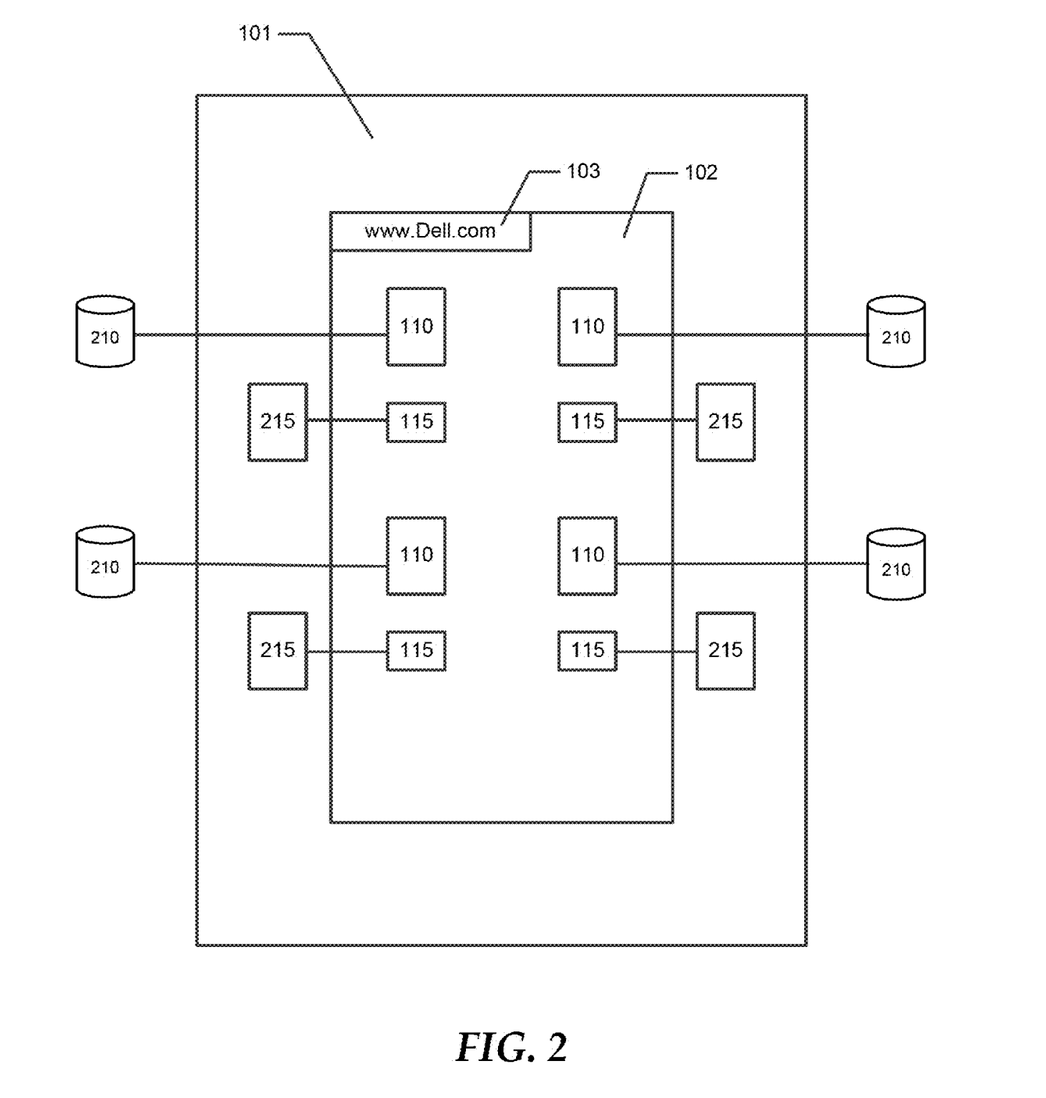
FIG. 2 is a diagrammatic representation of a website.

FIG. 2 shows media components 110 that may be provided to webpage 102 by media component repositories 210, which may be the same or different repositories. Hyperlink components 115 link to other webpages 215 of website 101.

Figure 3:
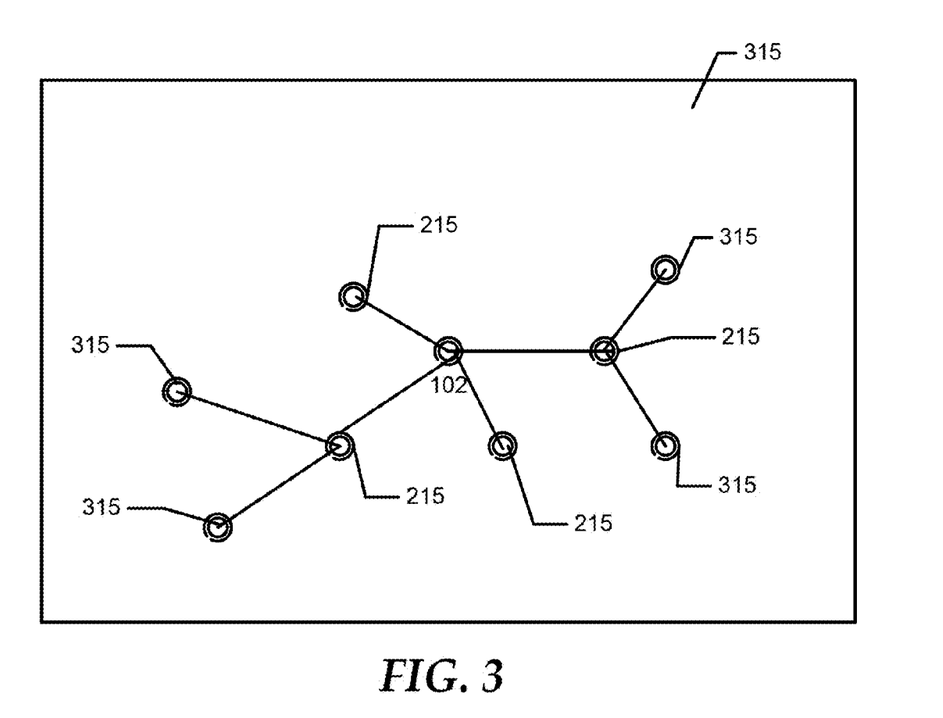
FIG. 3 is a diagrammatic representation of relationships between webpages.

FIG. 3 shows relationships or links between webpages of website 101. Webpage 102 links to webpages 215, and some of webpages 215 in turn have hyperlinks to webpages 315, which may also have hyperlinks to other webpages. Each of webpages 102, 215, and 315 may communicate with one or more servers hosting website 101, and content may be provided to webpages 102, 215, and 315 from the servers or from one or more databases or other repositories.

Webpage 102 includes link components directly linking webpages 215. Thus, webpage 102 is directly linked or connected to webpages 215 with hyperlink components. Webpage 102 is indirectly linked to webpages 315 via webpages 215 and the connections between webpage 102 and webpages 215, and the connections between webpages 215 and webpages 315. For purposes of testing webpages, a test environment may test webpages by testing the direct links between webpages. Thus, a webpage under test can be tested with regard to webpages in direct connection to the webpage under test. That is, a webpage under test may only need to be tested against webpages referenced by link components of the webpage to test the correctness of the webpage.

A representation of a webpage such as webpages 102, 215, and 315 may be stored in a repository as a template. Such a template may be a template including html code defining the particular webpage associated with the particular template. The template may further define an application, operating system, and configuration associated with the webpage. The template may be versioned with different versions in a template library of the repository.

Figure 4:
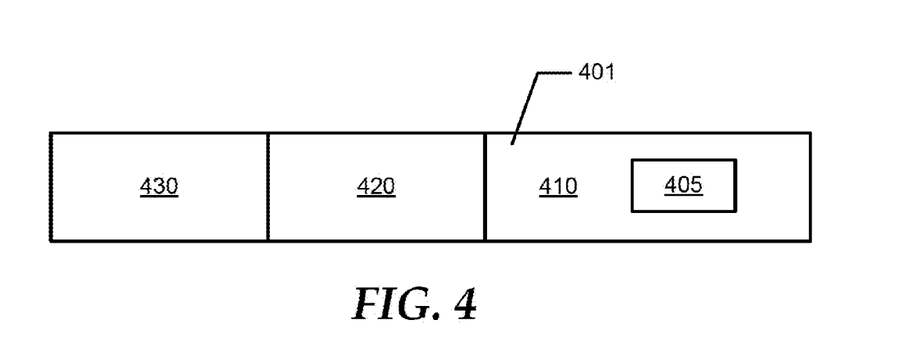
FIG. 4 is a diagrammatic representation of an example template representing a webpage.

FIG. 4 shows a template 401 representing a webpage such as webpage 102. Template 401 includes application information 410, configuration information 420, and operating system information 430. A template such as template 401 may be stored in a repository for each webpage of a website. The template may be versioned, and there may be triggers which indicate changes to the templates when a template is stored in the repository or updated. Application information 410 may include webpage information 405. Webpage information 405 may include information defining a specific webpage, such as media components, hyperlink components, and other components, for example.

A test environment accessing the repository of webpage templates may allow a user to test a webpage by retrieving the content and templates representing webpages directly associated with the webpage under test, virtually instantiating the content and webpages, and allowing a webpage developer to virtually test the functionality of the webpage under test with other webpages in the virtual test environment. More particularly, in the virtual test environment, a representation of a webpage under test may be instantiated from the template representing the webpage under test stored in a repository. Similarly, webpages referenced by link components of the webpage under test may be instantiated from respective templates stored in the repository.

Figure 5:
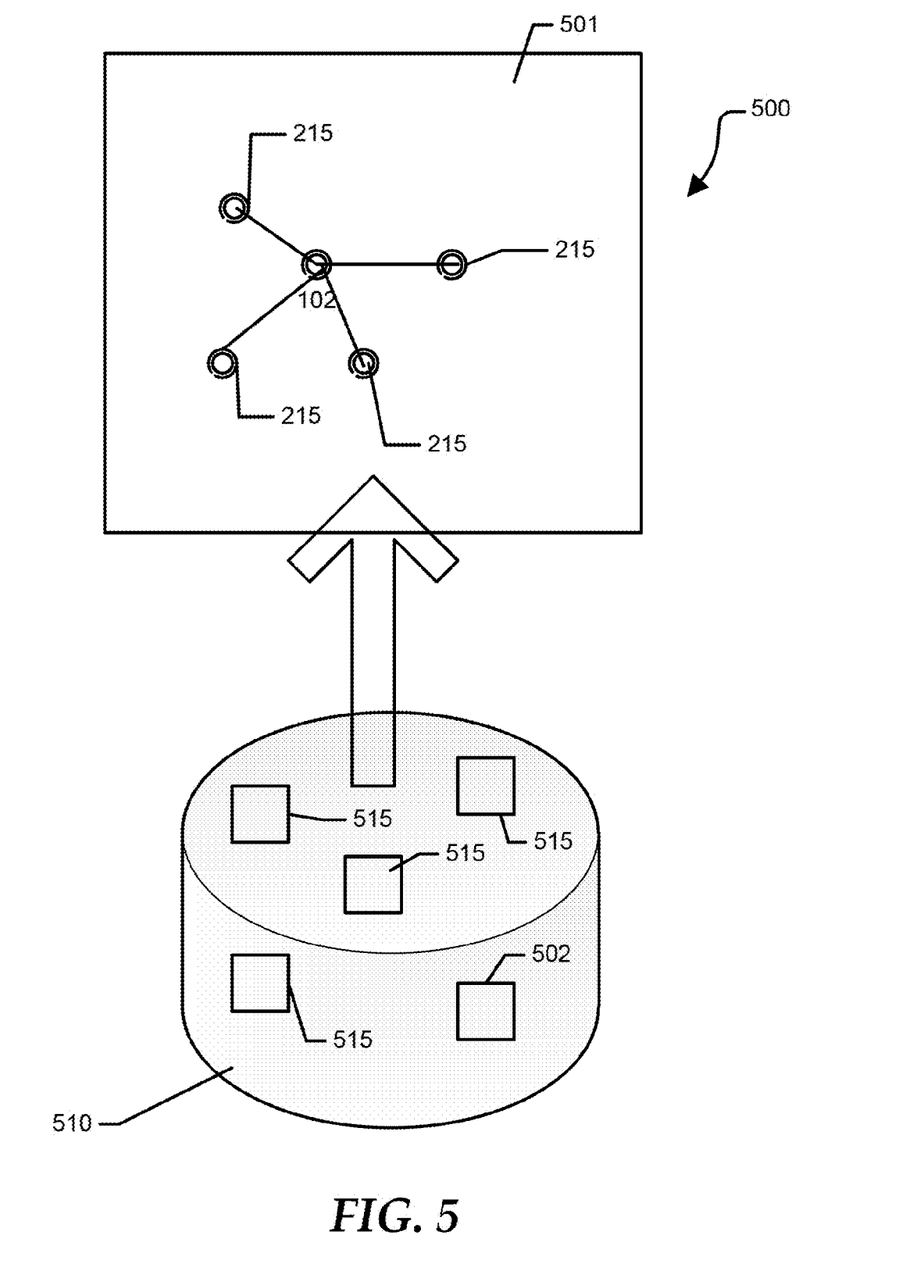
FIG. 5 is a diagrammatic representation of an example of a test environment.

FIG. 5 shows a test environment 500 based on the example provided in FIG. 3. As shown, test environment 500 is configured to test webpage 102 and includes test bench 501 and repository 510, or access thereto. To this end of testing webpage 102, as shown in test bench 501, webpage 102 is tested in the context of webpages 215 directly referenced by the hyperlinks of webpage 102, as shown. Repository 510 contains templates representing webpages: templates 515 represent webpages 215, while template 502 represents webpage 102.

A web designer may develop or test webpage 102 in test environment 500. Webpage 102 is instantiated from template 502. Webpages 215 associated with test webpage 102 are instantiated from templates 515, and the web developer can determine if webpage 102 functions as desired in the context of webpages 215.

Once an update or change is made to a webpage, for example webpage 102, the update or change may be propagated to repository 510 by updating or changing a template associated with the webpage, for example, webpage 502. Thus, repository 510 is dynamically updated with the current states and configurations of webpages upon a change or update to the webpage by updating the respective template. This allows for webpages to be accurately tested against each other using webpages instantiated from templates in repository 510.

Test environment 500 may be implemented by one or more virtual machines provisioned on a virtual infrastructure. For example, a virtual machine may host the webpage under test, a virtual machine may manage the repository, and a further virtual machine may manage components of webpages. Furthermore, virtual machines may be used to host the webpages interfacing with the webpage under test.

Because repository 510 is dynamically updated with regard to webpage changes and maintains a library of templates representing webpages, a webpage may be virtually tested against other webpages referenced by the hyperlink components of the webpage, thereby allowing for test of the webpage prior to deployment of the webpage to the web environment hosting the webpage. Webpages deployed to the web environment for hosting may have corresponding representations thereof, such as template 401 of FIG. 4, stored in the repository and may be used to test other webpages prior to deployment of those webpages. Thus, changes to webpages may be dynamically propagated to the repository such that webpages may be accurately developed and tested against dynamically updated webpage templates stored in the repository.

Figure 6:
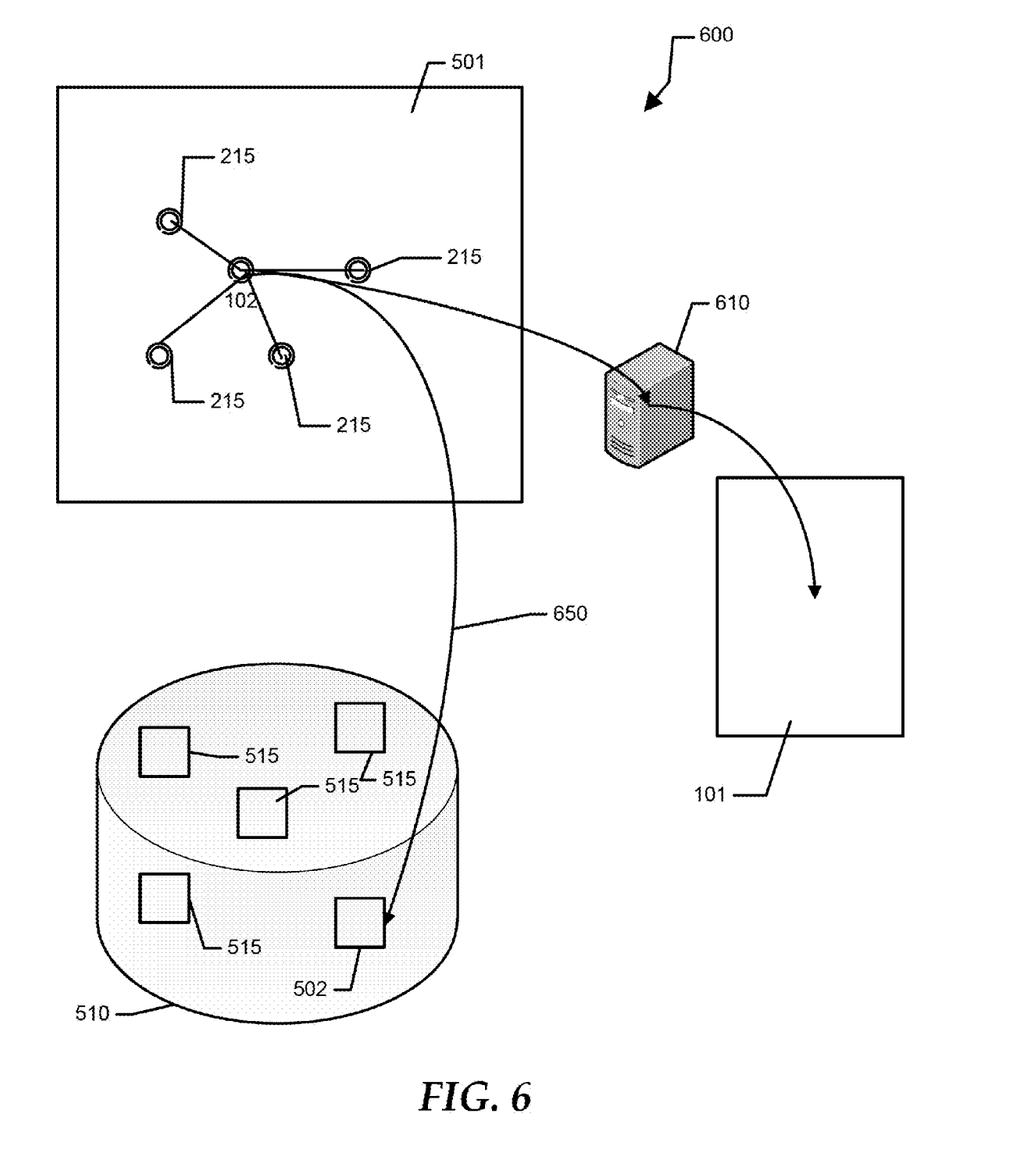
FIG. 6 is a diagrammatic representation of an example of a test and deployment environment.

FIG. 6 shows a test and deployment environment 600. Test and deployment environment 600 includes test bench 501 and repository 510, or access thereto. Test and deployment environment 600 further includes a proxy 610 coupling test bench 501 to website 101 from FIG. 1. A webpage may be deployed from test bench 501 to be hosted on website 101 via proxy 610. Once the webpage has been deployed for access by internet browsers onto the website, then the corresponding template in repository 510 may be updated with the information of the deployed webpage such that repository 510 maintains templates accurately representing deployed webpages, so that webpages may be tested using webpages correctly corresponding to deployed webpages.

More particularly, as shown in 600 and discussed above with regard to FIG. 5, webpage 102 is instantiated from template 502 and is being tested against webpages 215, instantiated from templates 515. Once web page 102 has been virtually tested with test bench 501, and deployed to website 101 via proxy 610 (as shown by the associated directional arrows), template 502 may be updated in repository 510 with any changes to webpage 102, as shown by update arrow 650. Thus, template 502 will be an updated representation of webpage 102 as deployed to a web environment, and may be used in test bench 501 to test other webpages, such as webpages 215, which have direct links to webpage 102 represented by template 502 in repository 510.

As further illustrated in environment 600, test bench 501 as well as repository 510 are isolated from website 101 by proxy 610; thus webpages are virtually tested and developed in isolation from deployment. Thus, developing and testing webpages with embodiments described herein avoids interfering with an operational website during development and test of webpages.

Figure 7:
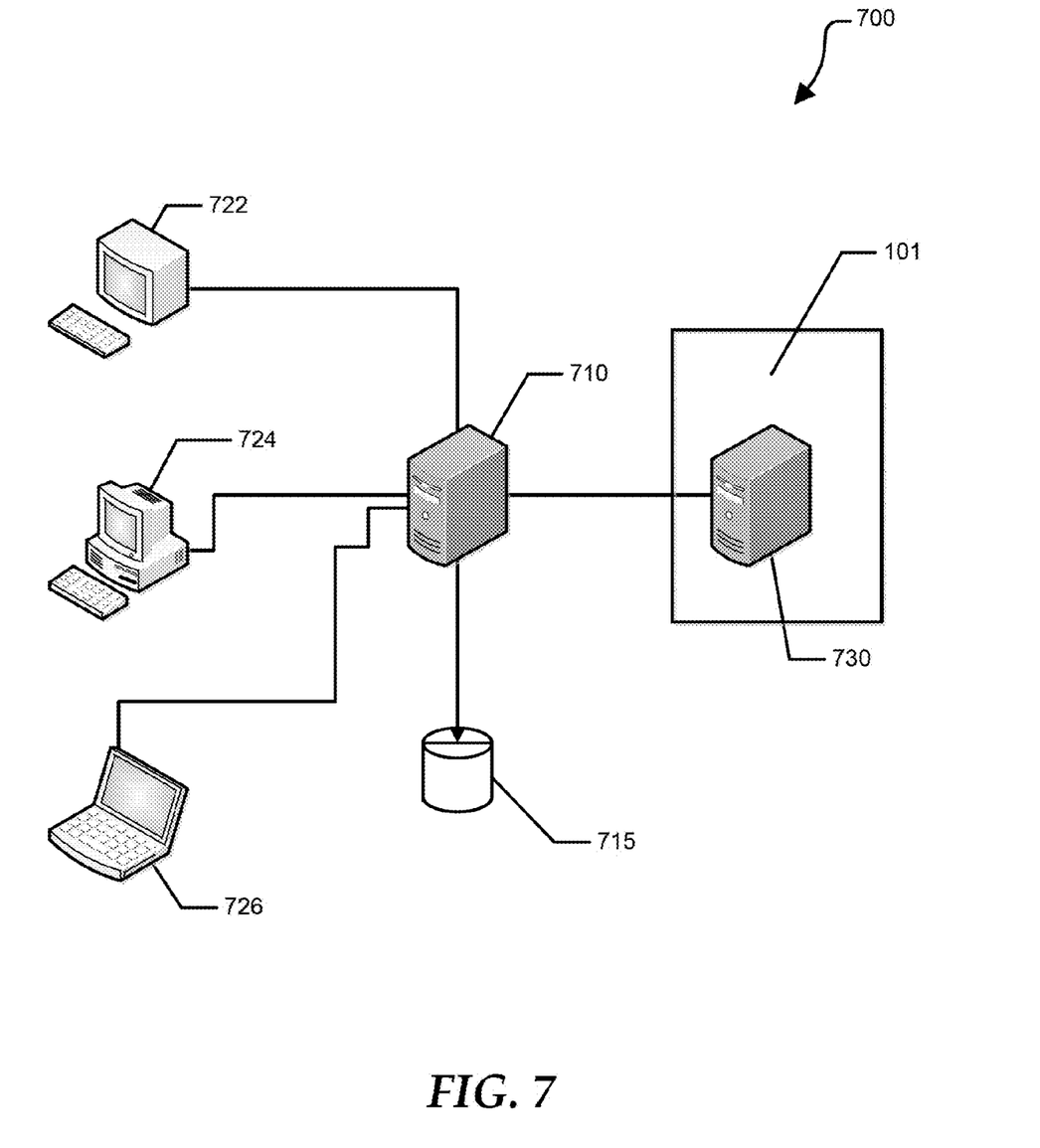
FIG. 7 is a diagrammatic representation of an example of a computer system operable to host a test environment.

FIG. 7 shows a computer system 700 that may be used to implement the test system described herein. Server 710 may host the virtual test environment as described herein, including a virtual test bench. Server 710 is in communication with repository 715 which stores templates representing webpages as described herein. Server 710 may access these stored templates in repository 715 and instantiate corresponding virtual webpages in a virtual test environment, as described herein. Developer computers 722, 724, and 726 are in communication with server 710 and may be operated by webpage developers to test and develop webpages in the virtual test environment hosted by server 710.

Server 710 is further in communication with server 730. As shown, server 730 hosts website 101 of FIGS. 1, 2, and 6. One or more of developer computers 722, 724, and 726 may indicate to server 710 that a webpage should be deployed to server 730 to be hosted as a webpage of website 101 hosted by server 730. Server 710 may then deploy a webpage to server 730 for hosting as part of website 101. Server 710 may further update a template in repository 715 from which the deployed webpage was instantiated. Server 710 may update the template with new or changed properties of the deployed webpage such that the associated template in the repository reflects the properties of the deployed webpage.

Repository 715 may contain a library of templates, each template associated with a respective webpage of a website. The templates may be versioned, and a set of versioned templates may be associated with a webpage, such that the library tracks changes to webpages. Furthermore, the test environment described herein may have check-in-triggers such that when a webpage is checked-in to the test environment by a developer, any changes to the webpage are propagated to the repository library as changes to the respective template, such that the repository maintains a dynamically updated library of templates representing deployed webpages. Dynamically updating the templates in the repository and allows for real-time updates to the templates so that the templates accurately represent deployed webpages.

Versioning templates to maintain a historical record of webpages allows for the test environment to provide historical webpage data. Furthermore, versioning of templates allows historical webpage configurations to be recreated. An advantage of the test environment as described herein is that a webpage may be comprehensively tested in the context of a website prior to deploying the webpage to the website. By testing a webpage in isolation from the web environment to host the webpage, webpage failure in the context of the web environment may be avoided. That is, since the functionality of the webpage is confirmed prior to deployment to a website, deployment of the webpage will not cause the active website to fail. Furthermore, the virtual test environment described herein allows for a webpage to be tested against different web environments prior to deployment to one or more of the web environments.

As discussed above, changes to webpages of a website can make the website unstable due to the interrelations among the webpages of the website. Frequent changes such as updates to webpages can make the webpages difficult to test for operability and correctness. If webpage updates are blocked or held in abeyance for test cycles testing the webpages, then the updates will build up over the duration of the abeyance, and may impede detecting possible compatibility or other issues between components of a website. However, frequently propagating changes to webpages leads to website instability and can impede verifying webpages of a website and components thereof.

In an embodiment, one or more virtual test environment(s) associated with a webpage may be instantiated in response to a change or a proposed change to the webpage. The instantiated environments may test webpages associated with the changed webpage. For example, templates associated with the webpages associated with a changed webpage or website to be changed may be used to instantiate a virtual test environment with a webpage and associated webpages to test the webpage. For example, a virtual test bench may be generated with regard to a webpage.

In order to detect webpage changes and instantiate one or more virtual test environment(s) in response to the detected webpage changes, a monitoring component may monitor for webpage changes or proposed changes. Once the monitoring component detects a webpage change, a virtual test environment as discussed above is instantiated for each webpage affected by the webpage change. Then the webpages are tested in the virtual test environments. Webpages may be instantiated from associated templates in a repository, as discussed above.

Referring to FIG. 7, server 710 may comprise a monitoring component that monitors changes to webpages of website 101. For example, server 710 may be in communication with server 730 hosting website 101 and the monitoring component of server 710 may monitor website 101 via communications with server 730 to detect changes propagated to the webpages of website 101 hosted by server 730. As discussed above, repository 715 comprises a library of templates representing webpages. The monitoring component of server 710 may be in communication with repository 715 and detect changes made to templates in repository 715. In response to detecting a change to either a webpage of website 101 or to a template of repository 715, the monitoring component may trigger instantiation of virtual test environments for webpages affected by the detected change, for example the changed (or to be changed) webpage and webpages directly associated with the detected change: for example webpages linked to the changed webpage.

In one embodiment, in response to detecting a change, server 710 may instantiate the test environments on one or more of developer computers 722, 724, and 726 or may provide a notification of a need to test webpages and an indication of the webpages to be tested based on the detected change.

Figure 8:
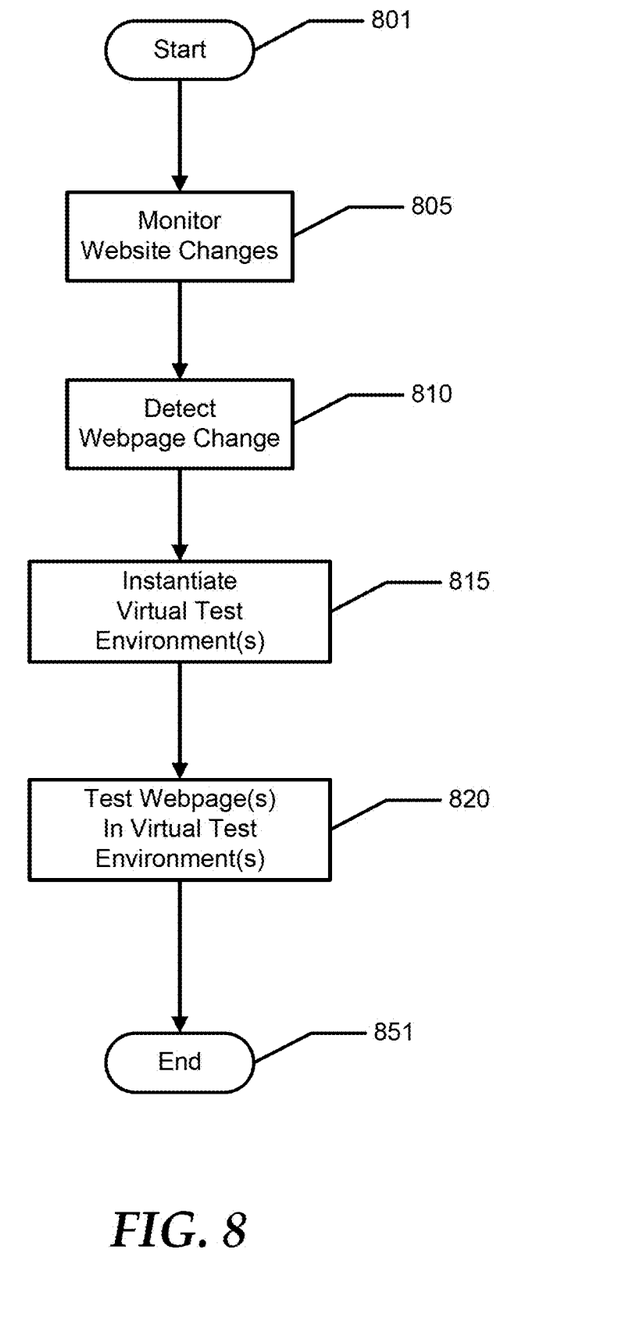
FIG. 8 is a flowchart of an example method for detecting webpage changes.

FIG. 8 shows an example method 800 for detecting webpage changes and instantiating virtual test environments in response. At 801, the method begins. At 805, the monitoring component monitors website changes. For example, the monitoring component may monitor for changes propagated to webpages of a website, or may monitor templates representing webpages in a repository for changes. At 810, a webpage change is detected. The webpage change may have been propagated to the associated website, or may be a change made to a template representing a webpage which may indicate a future webpage change. At 815, in response to detection of a webpage change by the monitoring component, virtual test environments are instantiated for one or more webpages affected by the webpage change. The virtual test environments may be populated with webpages based on templates stored in a repository as discussed above. At 820, the webpages in the virtual test environments are tested as discussed above. Then at 851, the method ends.

Thus, a set of virtual test environments will exist for each detected webpage change. This allows for the number of virtual test environments to grow or shrink dynamically in proportion to the number of webpage changes detected by the monitoring component and allows for webpages to be tested in parallel across multiple virtual test environments.

A library of templates representing webpages may comprise similar templates and these templates may not only represent webpages, but also versions of webpages. If templates specify the entirety of a webpage configuration, the data overhead required for the templates will be relatively high and rise in proportion to the size of the website being tested and the volume of testing carried out with regard to webpages of the website. For example, if an update is generally applied to webpages of a website, the individual templates in a template library will generally have to be individually updated in the library. Furthermore, the need to individually update templates may result in the updates not being propagated to one or more templates, such that those un-updated templates may not be used to accurately test webpages.

To reduce template overhead, templates may be instantiated in the repository based on one or more base templates. Templates representing individual webpages may be generated from the one or more base templates. Changes common to all webpages may be made to the base templates, such that individual templates representing individual webpages will include the general parameters of the base templates. Implementing changes to templates via one or more base templates ensures that the templates have the parameters of the base templates, such that changes may be propagated throughout templates in a template library by modifying the base templates with the desired changes. Furthermore, use of base templates allows for templates to be updated in a one to many fashion, where the modification of one base template propagates the modification to templates derived from the base template, thereby ensuring that the templates in the template library are updated with updates.

Figure 9:
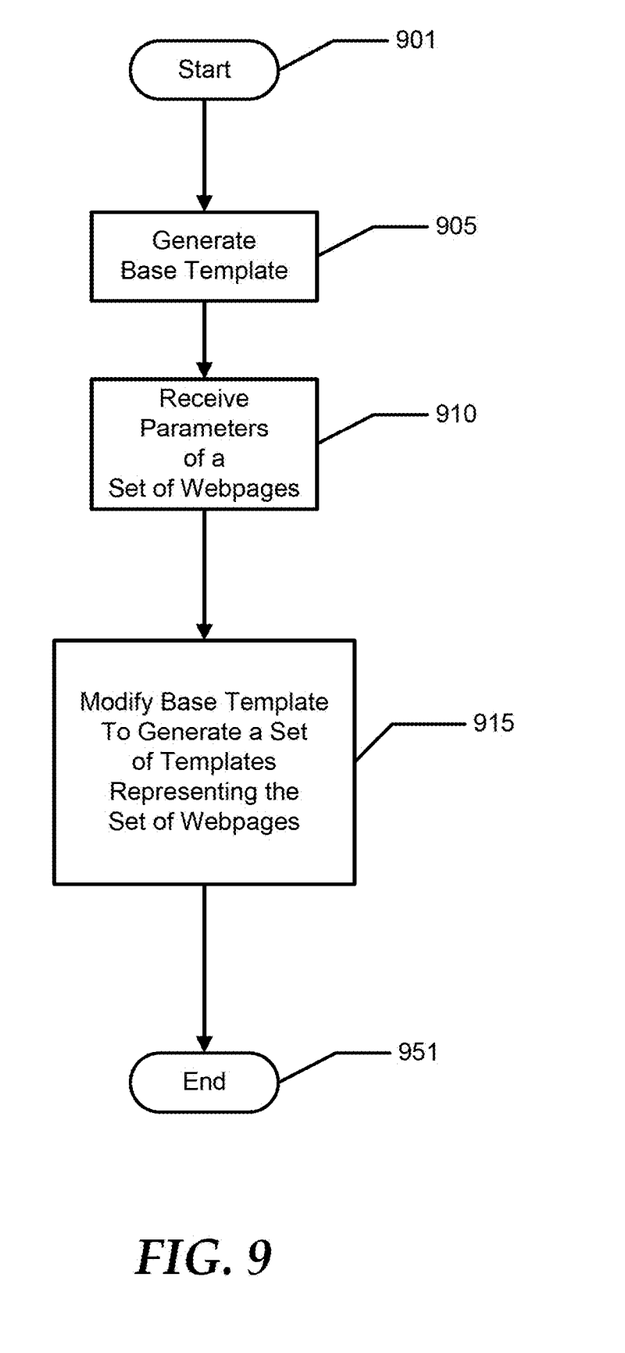
FIG. 9 is a flowchart of an example method for populating a library of templates.

FIG. 9 shows an example method 900 for populating a library of templates representing webpages. At 901 the method begins. At 905, a base template is generated. The base template may comprise parameters common to webpages of a website, such as a web browser compatibility or other parameters. At 910, parameters of a set of webpages are received. At 915, the base template is modified for each web page to generate a set of templates representing the set of web pages. That is, a template is generated from the base template for each webpage and modified to accurately represent the parameters of the corresponding webpage such that there is a set of templates representing the set of webpages generated from the base template. Furthermore, in embodiments, changes to a base template may be propagated to webpages derived from the base template. Thus, a change to a base template will be propagated to templates generated from the base template such that templates may be updated in a one to many fashion, where a change to a base template is propagated to templates representing individual webpages.

Tracking templates and the associations and names of individual templates may be challenging. For example, if template names are reused for different templates, confusion between templates and associations of templates may arise such that templates do not accurately represent webpages of a website.

A centralized server may coordinate naming of templates and the provisioning of virtual test environments. The server tracks templates and instantiations of virtual test environments. The server may further be configured to regulate template generation. For example, server 710 in conjunction with repository 715 may track and maintain templates in the template library of repository 715. Server 710 may further track instantiations of virtual test environments. Server 710 may track and record a history of instantiated virtual test environments. Server 710 may further version templates stored in repository 715 with version numbers. Server 710 may control naming of templates such that template names are not duplicative, and may update metadata associated with templates and virtual test environments.

Generation and maintenance of templates representing webpages in a repository requires generating and maintaining templates which may be a specialized task requiring personal training and further, possible human error in correctly generating templates may produce templates which do not accurately represent webpages and thus which cannot be used to correctly verify webpages.

A template generator may be used to generate templates from webpage source code, thereby mitigating the need for human users to generate templates. The template generator may further be configured to update templates based on webpage changes, thereby mitigating the need for human user to update templates.

Referring to FIG. 7, server 710 may comprise a template generator that may generate and update templates based on webpage source code. The template generator may store the generated templates in the template library of repository 715. Furthermore, the template generator may access the template library of repository 715 and update templates in the template library based on webpage changes to webpages represented by templates in the template library. Developers operating developer computers 722, 724, and 726 may make webpage source code available to the template generator upon propagating webpages to website 101. The template generator may then parse the webpage source code to develop templates representing new webpages and may parse the webpage source code to update templates in the repository when a template in the repository exists that represents a webpage provided by a developer computer 722, 724, or 726. Metadata associated with webpages may be used by the template generator to facilitate parsing webpages and correlating webpage changes with templates.

Figure 10:
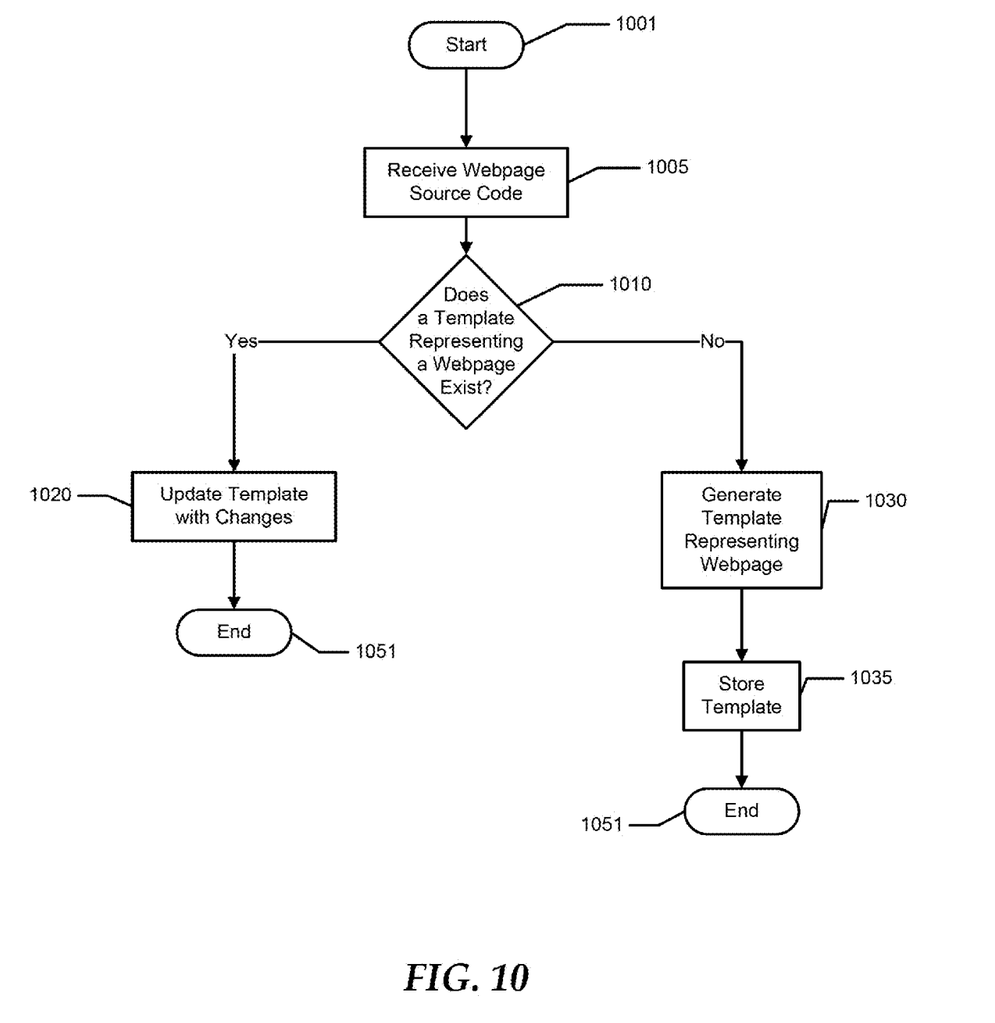
FIG. 10 is a flowchart of an example method for generating and updating templates.

FIG. 10 shows an example method 1000 for generating and updating templates representing webpages for use in a virtual test environment testing webpages of a web site. At 1001, the method begins. At 1005, a template generator is provided access to webpage source code. For example, a repository of webpage source code may be made available to the template generator, or the webpage generator may be provided with webpage source code by a webpage developer. At 1010, the template generator determines if a template representing a webpage exists, for example, in a library of templates.

If the template generator determines a template representing the webpage exists, at 1020, the template generator updates the template with any changes to the webpage source code associated with the webpage such that the template accurately represents the webpage. Then, at 1051, the method ends.

If the template generator determines a template representing the webpage does not exist, at 1030, the template generator generates a template representing the webpage. Subsequently, at 1035, the generated template is stored, for example, in a library of templates. Then, at 1051, the method ends.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A test system comprising:
   one or more processors;
   a repository including a library of templates, each template representing a respective webpage of a website, wherein the library of templates are versioned to track changes and maintain a historical record of the website; and
   a server in communication with the repository and configured to coordinate naming the templates in the library to prevent any two templates having duplicate names, the server hosting a monitoring component, configured to detect a change to a webpage of the website and update a template of the library of templates to incorporate the detected change, and
   wherein the test system is configured to instantiate a virtual test environment in response to detecting a change to the webpage and test the direct links between webpages, the virtual test environment configured to provide the webpage for testing the validity of links on the webpage, wherein a virtual test environments is instantiated for each detected webpage change and a number of virtual test environments dynamically changes in proportion to the number of webpage changes detected.

2. The test system of claim 1, wherein instantiating the virtual test environment comprises instantiating a virtual test bench including a representation of the webpage, the representation generated from a template of a library of templates, the template representing the webpage.

3. The test system of claim 1, wherein the test system is further configured to instantiate a respective virtual test environment for each additional webpage of the website directly linked to the webpage.

4. The test system of claim 1, wherein monitoring component monitors the website to detect the change to the webpage.

5. The test system of claim 1, wherein the monitoring component monitors the library of templates to detect the change to the webpage.

6. The test system of claim 1, wherein a number of instantiated virtual test environments is in proportion to a number of changes detected by the monitoring component.

7. The test system of claim 1, wherein the test system is further configured to provide a notification in response to instantiating the virtual test environment.

* * * * *